United States Patent
Creger

[15] 3,674,836
[45] July 4, 1972

[54] 2,2-DIMETHYL-ω-ARYLOXY-ALKANOIC ACIDS AND SALTS AND ESTERS THEREOF

[72] Inventor: Paul L. Creger, Ann Arbor, Mich.
[73] Assignee: Parke, Davis & Company, Detroit, Mich.
[22] Filed: April 24, 1969
[21] Appl. No.: 819,126

Related U.S. Application Data

[63] Continuation-in-part of Ser. No. 730,946, May 21, 1968, abandoned.

[52] U.S. Cl..................260/473 G, 260/408, 260/410.9 R, 260/413, 260/501.1, 260/501.17, 260/521 R, 260/521 A, 424/308, 424/316, 424/317, 424/318
[51] Int. Cl. ...................................................C07c 69/76
[58] Field of Search ....................260/410.9, 473, 408, 413

[56] References Cited

UNITED STATES PATENTS

3,369,025  2/1968  Bolhofer..............................260/520

FOREIGN PATENTS OR APPLICATIONS

6,607,056  1966  Netherlands

OTHER PUBLICATIONS

Cram et al., Organic Chemistry, McGraw-Hill N.Y., 1964, p. 268
Migrdichian, Organic Synthesis, Rheinhold Publishing Corp., N.Y., 1957, page 311 (I), page 336 (II)
Taylor, et al., C.A. 621, 5485d (1966)

*Primary Examiner*—Lorraine A. Weinberger
*Assistant Examiner*—John F. Terapane
*Attorney*—Robert R. Adams, David B. Ehrlinger, George M. Richards and Edward J. Gall

[57] ABSTRACT

A series of 2,2-dimethyl-ω-phenoxyalkanoic acids and 2,2-dimethyl-ω-(disubstituted phenoxy)alkanoic acids having 3 to 6 methylene groups between the phenoxy group or 0 phenoxy group and the carbon atom substituted by two methyl groups; and their salts and esters. The compounds reduce serum triglyceride levels and can be produced by (a) reacting an alkali metal derivative of an isobutyric acid, salt, or ester with a phenoxyalkyl halide or a disubstituted phenoxyalkyl halide; (b) esterifying a carboxylic acid; or (c) hydrolyzing a carboxylate ester.

7 Claims, No Drawings

2,2-DIMETHYL-ω-ARYLOXY-ALKANOIC ACIDS AND SALTS AND ESTERS THEREOF

CROSS REFERENCE TO RELATED APPLICATION

This is a continuation-in-part of my co-pending application Ser. No. 730,946, filed May 21, 1968, now abandoned

SUMMARY AND DETAILED DESCRIPTION

This invention relates to 2,2-dimethyl-ω-aryloxy-alkanoic acids and salts and esters thereof. More particularly, it relates to compounds of the formula

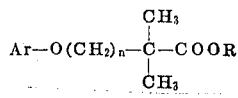

and to methods for their production; where $n$ represents 3, 4, 5, or 6; R represents hydrogen, a salt-forming cation, or a lower alkyl radical; and Ar represents phenyl or a group of the formula

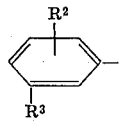

in which $R^2$ represents lower alkyl or halogen attached to the 2- or 3-position of the phenyl ring; and $R^3$ represents lower alkyl or halogen attached to the 5-position of the phenyl ring. In these formulas the lower alkyl radicals are preferably those containing not more than six carbon atoms, especially methyl; and the preferred halogen is chlorine.

In accordance with the invention, the foregoing compounds can be produced by reacting an alkali metal derivative of a compound of the formula

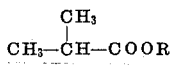

with an aryloxyalkyl halide of the formula $$Ar-O-(CH_2)_n-Hal$$

where $n$, R and Ar are as defined before and Hal represents halogen, preferably chlorine or bromine. The alkali metal derivative indicated above can be regarded as corresponding to the formula

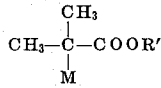

where M represents an alkali metal and R' represents a salt-forming cation or a lower alkyl radical. It is customarily prepared in situ by reacting isobutyric acid or a salt or ester of isobutyric acid with a strong base. Some examples of suitable strong bases are alkali metal triphenylmethides, alkali metal hydrides, alkali metal amides, and alkali metal tertiary alkoxides. Preferred strong bases for this purpose are lithium amides corresponding to the formula $$(lower\ alkyl)_2N-Li$$

especially lithium dimethylamide and lithium diisopropylamide. Some suitable solvents for use in the reaction are anhydrous polar solvents such as tetrahydrofuran, tetrahydropyran, dimethoxyethane, diethylene glycol dimethyl ether, and dimethyl sulfoxide. Tetrahydrofuran is a preferred solvent at lower temperatures whereas diethylene glycol dimethyl ether is a preferred solvent at higher temperatures. The reaction solvent can also contain hydrocarbons such as pentane, heptane, benzene, or toluene. The reactants can be employed in equimolar quantities although it is sometimes preferred to use an excess of the aryloxyalkyl halide, especially in the presence of sodium hydride and similar bases. The time and temperature of the reaction are dependent on the particular reactants used. In general, a temperature from about —50° to 175° C. and a reaction time of from one hour to 5 days can be used. According to the preferred method of carrying out the process, following formation of the alkali metal derivative with a lithium amide, the reaction is carried out at a temperature between 0°–30° C. for from 4 to 12 hours. At the completion of the reaction period the product is isolated, preferably after hydrolyzing the mixture with water. When R' represents an alkaline earth metal such as magnesium, acidic hydrolysis is preferred in order to avoid formation of insoluble magnesium hydroxide. When it is desired to isolate the product as an ester, prolonged exposure to the basic aqueous medium is avoided. In other cases the product is isolated directly as a salt or, following acidification, as the free acid.

Also in accordance with the invention, the esters of the invention, that is the compounds of the formula

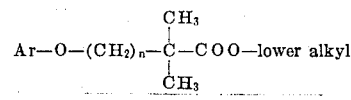

can be produced by reacting a carboxylic acid of the formula

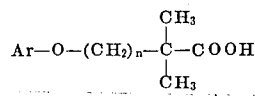

or a reactive derivative thereof, with a lower alkanol or a reactive derivative thereof; where $n$ and Ar are as defined before. The lower alkanols and their reactive derivatives serve as esterifying agents. Some examples of suitable reactive derivatives of the carboxylic acid are the acid anhydride, acid halides, and alkali metal salts of the acid. Some examples of suitable reactive derivatives of lower alkanols are various esters such as methyl bromide, methyl iodide, ethyl iodide, propyl iodide, dimethyl sulfate, and diethyl sulfate. Other reactive derivatives such as diazomethane can also be used.

When the esterifying agent is a lower alkanol, the process is preferably carried out by heating the free acid or the anhydride or halide with an excess of the lower alkanol. An acidic catalyst such as hydrogen chloride, sulfuric acid, or p-toluenesulfonic acid is preferably used when the free acid or the anhydride is one of the reactants. It is customary to use a large excess of the lower alkanol. An additional solvent such as heptane, toluene, xylene, or chlorobenzene can be present but is not necessary. The reaction is commonly carried out at a temperature between about 75°–175° C. but not higher than the reflux temperature, the preferred temperature range being from 100°–145° C. Under these conditions the reaction is essentially complete within 4 to 24 hours.

When the esterifying agent is an ester of a lower alkanol, as illustrated above, the process is preferably carried out by heating the carboxylic acid or salt thereof with the selected halide, sulfate, or other ester derivative in a solvent in the presence of a base. Some examples of suitable solvents are lower alkanols, tetrahydrofuran, dioxane, dimethylformamide, and diethylene glycol dimethyl ether. Some examples of suitable bases are alkali metal hydroxides, alkali metal carbonates, alkaline earth metal hydroxides, and alkali metal alkoxides. At last one equivalent and preferably an excess of the esterifying agent is used. The reaction is usually carried out at a temperature from 15°–150b$L$ C., preferably from 65°–135° C., and under these conditions it is substantially complete within 24 hours.

When the esterifying agent is diazomethane, the process is preferably carried out by treating the carboxylic acid with diazomethane in an unreactive solvent such as ether, tetrahydrofuran, diethylene glycol dimethyl ether, or dioxane. The reaction proceeds very rapidly and is essentially completed within less than 5 minutes by treating the carboxylic acid with one equivalent or a slight excess of diazomethane at 0° to 25° C.

Further in accordance with the invention, the carboxylic acids and salts of the invention, that is the compounds of the formula

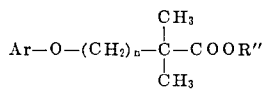

can be produced by reacting a compound of the formula

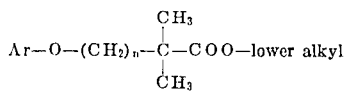

with a hydrolytic agent; where $n$ and Ar are as defined before and R" represents hydrogen or a salt-forming cation. Some examples of suitable hydrolytic agents are water; aqueous solutions of bases such as alkali metal hydroxides, alkaline earth metal hydroxides, alkali metal carbonates, alkali metal alkoxides, and trialkylammonium hydroxides; aqueous solutions of acids such as mineral acids and strong organic acids; and acidic ion exchange resins. The preferred hydrolytic agents are aqueous solutions of alkali metal hydroxides. Some suitable solvents for the reaction are water or aqueous solutions of lower alkanols, acetone, methyl ethyl ketone, dioxane, tetrahydrofuran, ethylene glycol, propylene glycol, a lower alkyl ether of ethylene glycol, or a lower alkyl ether of diethylene glycol. Under basic conditions, a preferred solvent is ethylene glycol monoethyl ether containing 10 percent water. Under acidic conditions, a preferred solvent is acetone containing 10 percent water. At least the calculated amount and preferably a large excess of the hydrolytic agent is used. The time and temperature of the reaction are not critical. It is customary to carry out the hydrolysis at a temperature between 10° to 250° C., or at the reflux temperature, for from 15 minutes to 96 hours, the longer reaction times being used at the lower temperatures. Using aqueous solutions of alkali metal hydroxides, optionally containing an additional solvent, the preferred reaction conditions are 80°–135° C. for a period of up to 18 hours. The product is isolated either as the free carboxylic acid or as a salt by adjustment of the pH as required.

The carboxylic acids of the invention form carboxylate salts with any of a variety of inorganic and organic bases. Pharmaceutically-acceptable salts are formed with bases such as sodium hydroxide, sodium carbonate, sodium bicarbonate, potassium hydroxide, calcium hydroxide, ammonia, and amines. The salts are converted to the carboxylic acids by treatment with an acid. The carboxylic acids and their salts differ in solubility properties but in general are otherwise equivalent for the purposes of the invention.

The compounds of the invention are new chemical substances, of value as pharmacological agents which reduce serum triglyceride levels. An important property of these compounds is that they reduce serum triglyceride levels without causing a corresponding reduction in serum cholesterol levels. The effectiveness of the compounds of the invention in lowering serum triglycerides can be demonstrated by standard methods. For example, male rats weighing 200–250 g. are maintained on a normal pellet diet. Each animal in a treatment group is given a daily oral dose of 250 mg./kg. body weight of a test compound for 7 days. An untreated control group is also maintained. At the end of the 7-day test period the animals are weighed and sacrificed, and the serum cholesterol and serum triglycerides are determined from blood samples taken from the vena cava. The methods used are described in "Journal of Laboratory and Clinical Medicine," 50, 318 (1957) and "-Journal of Laboratory and Clinical Medicine," 50, 152 (1957). The test compound is considered to exhibit a side effect if the weight of the animals in the treatment group is significantly less than the weight of the animals in the control group. In a representative determination, 2,2-dimethyl-5-phenoxyvaleric acid at 250 mg./kg. per day for 7 days produced a 76 percent reduction of serum triglycerides with no effect on serum cholesterol or weight of the animals, relative to the untreated control group. Under the same conditions, the ethyl ester of this acid also produced a 76 percent reduction of serum triglycerides with no effect on serum cholesterol or weight of the animals, relative to the untreated control group. These results are typical of those observed for the various compounds of the invention. Lesser effects on serum triglycerides appear at oral doses of less than 250 mg./kg. per day. The compounds can also be given by the parenteral route if desired.

Some of the compounds of the invention are preferred compounds because they produce a substantial lowering of serum triglyceride levels at relatively small dosage levels. For example, 2,2-dimethyl-5-(2,5-xylyloxy)valeric acid at 7.5 mg./kg. per day for 7 days produced a 34 percent reduction of serum triglycerides with no effect on serum cholesterol or weight of the animals, relative to the untreated control group. Similarly, 2,2-dimethyl-5-(3,5-xylyloxy)valeric acid at 7.5 mg./kg. per day for 7 days produced a 38 percent reduction of serum triglycerides with no effect on serum cholesterol or weight of the animals, relative to the untreated control group. In general, the compounds having two substituents on the phenyl ring of the aryloxy group are the preferred compounds of the invention.

The invention is illustrated by the following examples.

EXAMPLE 1

With stirring and external cooling to maintain the temperature below 10° C., 250 ml. of a 1.6 N solution of n-butyllithium in heptane is added to a solution of 41 g. of diisopropylamine and 250 ml. of anhydrous tetrahydrofuran under nitrogen. The resulting mixture contains lithium diisopropylamide. After 10 minutes a solution of 17.6 g. of isobutyric acid in 25 ml. of tetrahydrofuran is added and the reaction mixture is stirred an additional 10 minutes at 0° C. and an additional 30 minutes at room temperature. It is cooled again to 0° C. and treated with a solution of 43.0 g. of 3-phenoxypropyl bromide in 50 ml. of tetrahydrofuran while the temperature is maintained below 10° C. After 15 minutes the mixture is allowed to warm to room temperature and stirring is continued for 16 hours. The mixture is hydrolyzed with 500 ml. of water and the aqueous phase is separated, washed with 200 ml. of ether, and acidified with 70 ml. of 6 N sulfuric acid to give an insoluble product, 2,2-dimethyl-5-phenoxyvaleric acid. For purification, the product is dissolved in ether and the ether solution is washed with water, dried over magnesium sulfate, and evaporated. The product is crystallized from isooctane; m.p. 73°–75 C.

In the foregoing general procedure, 23.2 g. of ethyl isobutyrate is substituted for the isobutyric acid and the quantities of diisopropylamine and n-butyllithium are cut in half. Immediately following treatment of the reaction mixture with 500 ml. of water, as described above, the organic phase is separated, washed with water, dried, and evaporated. The product obtained is ethyl 2,2-dimethyl-5-phenoxyvalerate; b.p. 109°–111° C. at 0.5 mm. of Hg.

A solution of 2.22 g. of 2,2-dimethyl-5-phenoxyvaleric acid in 10 ml. of hot ethanol is treated with 10 ml. of 1 N aqueous sodium hydroxide solution. The solution is evaporated to give a residue of 2,2-dimethyl-5-phenoxyvaleric acid sodium salt. This sodium salt, 2.45 g., is dissolved in 50 ml. of methanol and a solution of 1.4 g. of choline chloride in 10 ml. of ethanol is added. After one hour the insoluble sodium chloride is removed by filtration and the filtrate is evaporated to dryness to give a residue of 2,2-dimethyl-5-phenoxyvaleric acid choline salt.

The potassium, ammonium, and ethylamine salts are obtained by reacting 2,2-dimethyl-5-phenoxyvaleric acid with potassium hydroxide, ammonia, and ethylamine respectively.

EXAMPLE 2

By the general procedure of Example 1, with the substitution of 45.8 g. of 4-phenoxybutyl bromide in 100 ml. of tetrahydrofuran for the 3-phenoxypropyl bromide in tetrahydrofuran, the product obtained is 2,2-dimethyl-6-phenoxyhexanoic acid; m.p. 106°–107.5° C. following crystallization from acetonitrile.

A solution of 1.05 g. of diethanolamine in 20 ml. of acetone is added to 2.36 g. of 2,2-dimethyl-6-phenoxy-hexanoic acid in 30 ml. of acetone. The mixture is stirred for 10 minutes, diluted with 30 ml. of petroleum ether, and allowed to stand. The insoluble 2,2-dimethyl-6-phenoxy-hexanoic acid diethanolamine salt is collected.

EXAMPLE 3

By the general procedure of Example 1, with the substitution of 48.6 g. of 5-phenoxypentyl bromide for the 3-phenoxypropyl bromide, the product obtained is 2,2-dimethyl-7-phenoxyheptanoic acid; m.p. 83°–84.5° C. following crystallization from acetonitrile.

EXAMPLE 4

By the general procedure of Example 1, with the substitution of 51.4 g. of 6-phenoxyhexyl bromide for the 3-phenoxypropyl bromide, the product obtained is 2,2-dimethyl-8-phenoxyoctanoic acid; m.p. 92°–93.5° C. following crystallization from acetonitrile.

EXAMPLE 5

A mixture of 22.2 g. of 2,2-dimethyl-5-phenoxy-valeric acid, 13.5 g. of absolute ethanol, 1.0 g. of p-toluenesulfonic acid monohydrate, and 125 ml. of toluene is heated at reflux for 5 hours with continuous removal of the water formed in the reaction. The mixture is cooled, stirred with 100 ml. of 2 N sodium hydroxide, and extracted with ether. The ether phase is washed with water, dried, and concentrated to give a residue of ethyl 2,2-dimethyl-5-phenoxyvalerate; b.p. 109°–111° C. at 0.5 mm. of Hg.

EXAMPLE 6

A mixture of 22.2 g. of 2,2-dimethyl-5-phenoxy-valeric acid, 22 g. of 1-butanol, 1.5 g. of p-toluene-sulfonic acid monohydrate, and 150 ml. of toluene is heated at reflux for 24 hours with continuous removal of the water formed in the reaction. The mixture is cooled, diluted with ether, and washed with 10 percent sodium carbonate solution and with water. The organic phase is dried over magnesium sulfate and concentrated to dryness to give a residue of butyl 2,2-dimethyl-5-phenoxyvalerate; b.p. 124°–126° C. at 0.4 mm. of Hg.

By the foregoing general procedure, with the substitution of equivalent amounts of 2,2-dimethyl-6-phenoxyhexanoic acid and 1-hexanol for the 2,2-dimethyl-5-phenoxyvaleric acid and 1-butanol, the product obtained is hexyl 2,2-dimethyl-6-phenoxyhexanoate.

By the foregoing general procedure, with the substitution of equivalent amounts of 2,2-dimethyl-6-phenoxyhexanoic acid and ethanol for the 2,2-dimethyl-5-phenoxyvaleric acid and 1-butanol, the product obtained is ethyl 2,2-dimethyl-6-phenoxyhexanoate; b.p. 119°–121° C. at 0.5 mm. of Hg.

EXAMPLE 7

A solution of 2.5 g. of ethyl 2,2-dimethyl-5-phenoxyvalerate, 10 ml. of 1.0 N aqueous sodium hydroxide, and 35 ml. of ethylene glycol monoethyl ether containing 10 percent water is heated at reflux for 16 hours and then concentrated to a small volume under reduced pressure, diluted with water, and washed with ether. The aqueous phase is acidified with dilute hydrochloric acid and extracted with ether. The ether extracts are washed with water, dried, and evaporated to give a residue of 2,2-dimethyl-5-phenoxyvaleric acid; m.p. 73°–75° C. following crystallization from isooctane.

By the foregoing general procedure, with the substitution of 2.6 g. of ethyl 2,2-dimethyl-6-phenoxyhexanoate or 3.2 g. of hexyl 2,2-dimethyl-6-phenoxyhexanoate for the ethyl 2,2-dimethyl-5-phenoxyvalerate, the product obtained is 2,2-dimethyl-6-phenoxyhexanoic acid; m.p. 106°–107.5° C. following crystallization from acetonitrile.

EXAMPLE 8

With stirring, 44.1 g. of isobutyric acid is added to a mixture of 51.0 g. of diisopropylamine, 23.2 g. of a 57 percent sodium hydride dispersion in mineral oil, and 350 ml. of tetrahydrofuran. When gas evolution subsides, the mixture is heated at reflux for 15 minutes, cooled to 0° C., and treated with 345 ml. of a 1.45 M solution of n-butyllithium in heptane. After 5 hours, the mixture is warmed one-half hour at 30° C., cooled to 0° C., and treated with 122.0 g. of 3-(2,5-xylyloxy)propyl bromide. After one more hour, it is stirred with 500 ml. of water and the aqueous phase is separated and acidified with 150 ml. of 6 N hydrochloric acid. The acidic mixture is extracted with ether and the ether extract is washed with saturated sodium chloride solution, dried over magnesium sulfate, concentrated almost to dryness, and distilled in vacuo. A distillate of 2,2-dimethyl-5-(2,5-xylyloxy)-valeric acid is collected at b.p. 158°–159° C. at 0.02 mm. of Hg; m.p. 61°–63° C. following crystallization from hexane.

The same product is obtained by substituting 4.4 g. of lithium hydride for the sodium hydride in the above procedure.

The same product is also obtained in the following manner. A mixture of 26.4 g. of isobutyric acid, 6.0 g. of magnesium oxide powder, and 250 ml. of toluene is stirred and heated at reflux with continuous removal of the water formed in the reaction. When water formation ceases, the resulting mixture containing magnesium isobutyrate is concentrated to one-half its original volume, cooled in an ice bath, and treated with 31.0 g. of diisopropylamine in 200 ml. of dry tetrahydrofuran and then with 179 ml. of 1.68 M n-butyllithium in heptane while the temperature is maintained below 10° C. After 15 more minutes, the mixture is warmed at 30° C. for one-half hour, cooled to 0°–10° C., and treated with 75.0 g. of 3-(2,5-xylyloxy)propyl bromide. The mixture is then stirred for 18 hours at room temperature and diluted with 125 ml. of 6 N hydrochloric acid and 250 ml. of water. The organic phase is separated, concentrated, and the residue distilled in vacuo to give 2,2-dimethyl-5-(2,5-xylyloxy)valeric acid.

The following additional products are obtained by substituting an equivalent amount of another aryloxyalkyl halide for the 3-(2,5-xylyloxy)propyl bromide in the procedure of the first paragraph of this example.

From 3-(carvacryloxy)propyl bromide, the product obtained is 5-(carvacryloxy)-2,2-dimethylvaleric acid; b.p. 152°–154° C. at 0.02 mm. of Hg.

From 3-(2-tert-butyl-5-methylphenoxy)propyl chloride, the product obtained is 5-[(6-tert-butyl-m-tolyl)oxy]-2,2-dimethylvaleric acid; m.p. 87°–89° C. following crystallization from acetonitrile.

From 3-(2,5-di-tert-butylphenoxy)propyl chloride, the product obtained is 5-(2,5-di-tert-butylphenoxy)-2,2-dimethylvaleric acid; m.p. 121°–123° C. following crystallization from acetonitrile.

From 6-(2,5-dichlorophenoxy)hexyl bromide, the product obtained is 8-(2,5-dichlorophenoxy)-2,2-dimethyloctanoic acid; m.p. 75°–76° C. following crystallization from acetonitrile.

EXAMPLE 9

By the general procedure of Example 1, with the substitution of an equivalent amount of another aryloxyalkyl halide for the 3-phenoxypropyl bromide, the following additional products are obtained.

From 3-(3,5-di-tert-butylphenoxy)propyl chloride, the product obtained is 5-(3,5-di-tert-butylphenoxy)-2,2-dimethylvaleric acid; m.p. 121.5°–123° C. following crystallization from acetonitrile.

From 3-[(5-chloro-o-tolyl)oxy]propyl chloride, the product obtained is 5-[(5-chloro-o-tolyl)oxy]-2,2-dimethylvaleric acid; m.p. 46°–48° C. following crystallization from hexane.

From 3-(2,5-dichlorophenoxy)propyl bromide, the product obtained is 5-(2,5-dichlorophenoxy)-2,2-dimethylvaleric acid; m.p. 83°–84.5° C. following crystallization from ether.

From 3-(3,5-dichlorophenoxy)propyl bromide, the product obtained is 5-(3,5-dichlorophenoxy)-2,2-dimethylvaleric acid; m.p. 105°–107° C. following crystallization from ether.

From 4-(2,5-xylyloxy)butyl bromide, the product obtained is 2,2-dimethyl-6-(2,5-xylyloxy)hexanoic acid; m.p. 74°–75° C. following crystallization from ether-hexane.

From 5-(2,5-xylyloxy)pentyl bromide, the product obtained is 2,2-dimethyl-7-(2,5-xylyloxy)heptanoic acid; b.p. 168°-177° C. at 0.15 mm. of Hg; m.p. 55°-57° C.

From 6-(2,5-xylyloxy)hexyl bromide, the product obtained is 2,2-dimethyl-8-(2,5-xylyloxy)octanoic acid; m.p. 68°-70° C.

EXAMPLE 10

With stirring, 33.0 g. of dry sodium isobutyrate (prepared from isobutyric acid and sodium hydroxide) is added to a solution of 31.0 g. of diisopropylamine in 300 ml. of anhydrous tetrahydrofuran. With external cooling to maintain the temperature below 10° C., 217 ml. of a 1.45 M solution of n-butyllithium in heptane is added. The mixture is then stirred at 30° C. for one-half hour and treated with 75.0 g. of 3-(3,5-xylyloxy)propyl bromide dissolved in tetrahydrofuran. After 15 minutes, the mixture is allowed to warm to room temperature and stirring is continued for 16 hours. The mixture is hydrolyzed with 500 ml. of water and the aqueous phase is separated, washed with 200 ml. of ether, and acidified with 6 N sulfuric acid to give 2,2-dimethyl-5-(3,5-xylyloxy)valeric acid as an insoluble product. For purification, the product is dissolved in ether and the ether solution is washed with water, dried over magnesium sulfate, and evaporated. The product is crystallized from hexane; m.p. 92°-93° C.

EXAMPLE 11

A mixture of 24.3 g. of 2,2-dimethyl-5-(3,5-xylyloxy)valeric acid, 13.5 g. of absolute ethanol, 1.0 g. of p-toluenesulfonic acid monohydrate, and 125 ml. of toluene is heated at reflux for 5 hours with continuous removal of the water formed in the reaction. The mixture is cooled, made basic with 2 N sodium hydroxide, and extracted with ether. The ether phase is washed with water, dried, and concentrated to give a residue of ethyl 2,2-dimethyl-5-(3,5-xylyloxy)valerate; b.p. 123°-124° C. at 0.5 mm. of Hg.

STARTING MATERIALS

With stirring, 75.0 g. of carvacrol is added to a slurry of 12.0 g. of sodium hydride and 300 ml. of tetrahydrofuran. When gas evolution ceases, the mixture is chilled in an ice bath and 95.0 g. of 1-bromo-3-chloropropane is added. The resulting mixture is heated at 50° C. for 16 hours and then stirred with 500 ml. of water. The organic phase is washed with 2 N sodium hydroxide solution and with saturated sodium chloride solution, dried, concentrated, and distilled in vacuo. 3-(Carvacryloxy)propyl bromide is collected as a distillate; b.p. 85°-100b$L$ C. at 0.5 mm. of Hg.

A mixture of 14.4 g. of sodium hydride in 300 ml. of dimethylformamide is treated dropwise with a solution of 98.5 g. of 2-tert-butyl-5-methylphenol in 100 ml. of dimethylformamide while the reaction temperature is maintained below 35° C. Stirring is continued for 16 hours and the mixture is then treated with 91.5 g. of 1-bromo-3-chloropropane at a temperature below 35° C. Stirring is continued for 22 more hours following which the mixture is diluted with water and extracted with ether. The ether extract is washed with water, dried over magnesium sulfate, and concentrated in vacuo. The residue is dissolved in hexane and the solution washed with 10 percent aqueous sodium hydroxide and with water, dried, concentrated, and distilled in vacuo. A distillate of 3-(2-tert-butyl-5-methylphenoxy)propyl chloride is obtained; b.p. 82°-93 C. at 0.05 mm. of Hg. The following additional compounds are prepared similarly from the corresponding phenol and 1-bromo-3-chloropropane. 3-(2,5-Di-tert-butylphenoxy)propyl chloride; b.p. 100°-112° C. at 0.05 mm. of Hg. 3-(3,5-Di-tert-butylphenoxy)propyl chloride; b.p. 125°-133° C. at 0.05 mm. of Hg.

A mixture of 30.6 g. of 2-methyl-5-chlorophenol and 47.3 g. of 1-bromo-3-chloropropane is stirred at 100° C. and treated dropwise with a solution of 8.6 g. of sodium hydroxide in 134 ml. of water. The mixture is heated at reflux for 16 hours, cooled, and diluted with hexane. The organic phase is separated, washed with 10 percent aqueous sodium hydroxide and with water, dried over magnesium sulfate, concentrated, and distilled in vacuo. A distillate of 3-[(5-chloro-o-tolyl)oxy]propyl chloride is collected; b.p. 181°-186° C. at 10.0 mm. of Hg. The following additional compounds are prepared similarly by reacting the corresponding phenol with an α,ω-dibromoalkane. 3-(3,5-Dichlorophenoxy)propyl bromide; b.p. 130° C. at 0.35 mm. of Hg. 4-(2,5-Xylyloxy)butyl bromide; b.p. 95°-126° C. at 2.0 mm. of Hg. 5-(2,5-Xylyloxy)pentyl bromide; b.p. 106°-112° C. at 1.5 mm. of Hg. 6-(2,5-Xylyloxy)hexyl bromide; b.p. 121°-123° C. at 1.5 mm. of Hg. 6-(2,5-Dichlorophenoxy)hexyl bromide; b.p. 140°-155° C. at 0.15 mm. of Hg.

I claim:

1. A compound of the formula

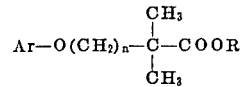

where
n is 3, 4, 5, or 6;
R is a member of the class consisting of hydrogen, pharmaceutically-acceptable salt-forming cations, and lower alkyl; and Ar is a member of the class consisting of phenyl and groups of the formula

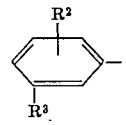

in which $R^2$ represents lower alkyl or halogen attached to the 2- or 3-position of the phenyl ring and $R^3$ represents lower alkyl or halogen attached to the 5-position of the phenyl ring.

2. A compound according to claim 1 wherein R represents hydrogen.

3. A compound according to claim 1 wherein R represents lower alkyl.

4. A compound according to claim 1 which is 2,2-dimethyl-5-phenoxyvaleric acid.

5. A compound according to claim 1 which is 2,2-dimethyl-6-phenoxyhexanoic acid.

6. A compound according to claim 1 which is 2,2-dimethyl-5-(2,5-xylyloxy)valeric acid.

7. A compound according to claim 1 which is 2,2-dimethyl-5-(3,5-xylyloxy)valeric acid.

* * * * *